Sept. 16, 1952 L. M. KAHN 2,610,523
AUTOMATIC BALANCING SYSTEM FOR ROTATABLE
ARTICLE HANDLING MACHINES
Filed Dec. 16, 1950 2 SHEETS—SHEET 1
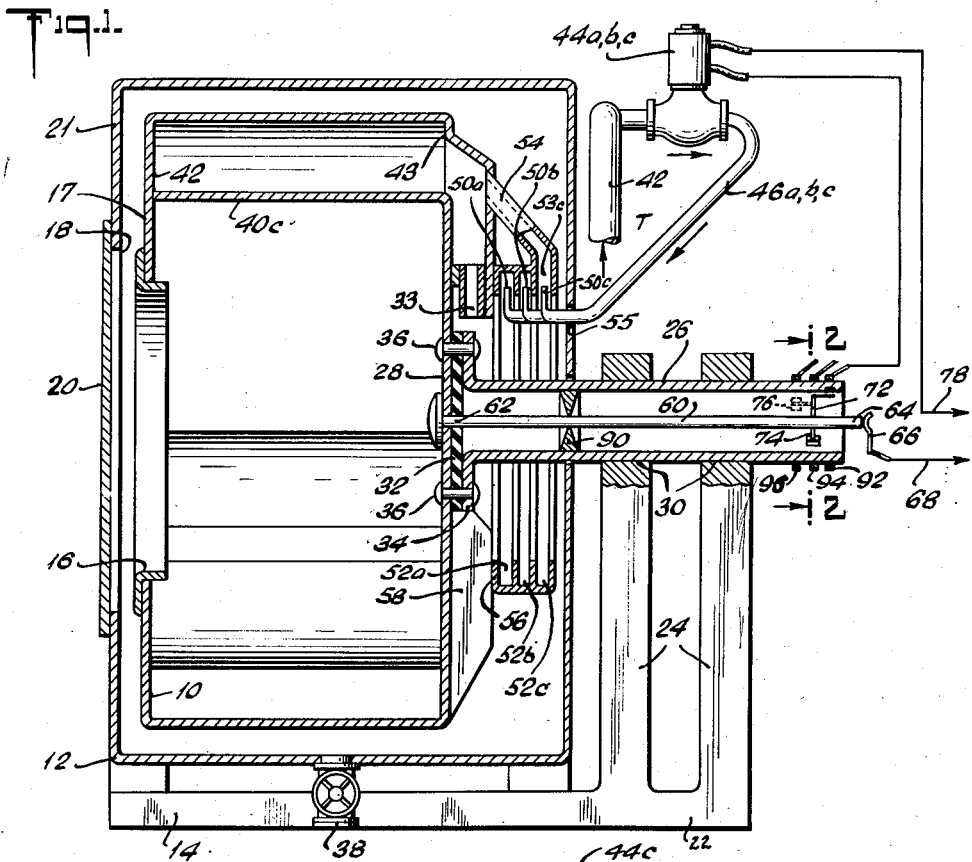
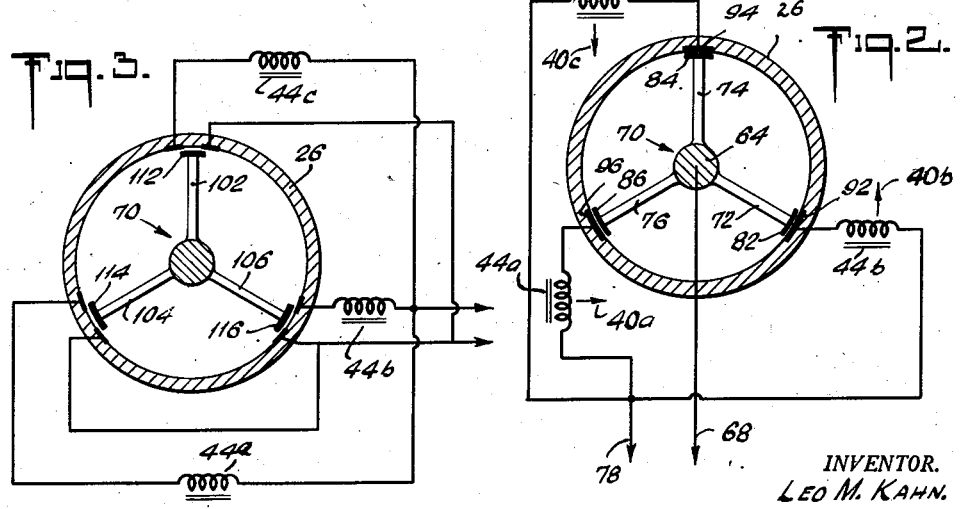
INVENTOR.
LEO M. KAHN.
BY
W.R. Lieberman
ATTORNEY.

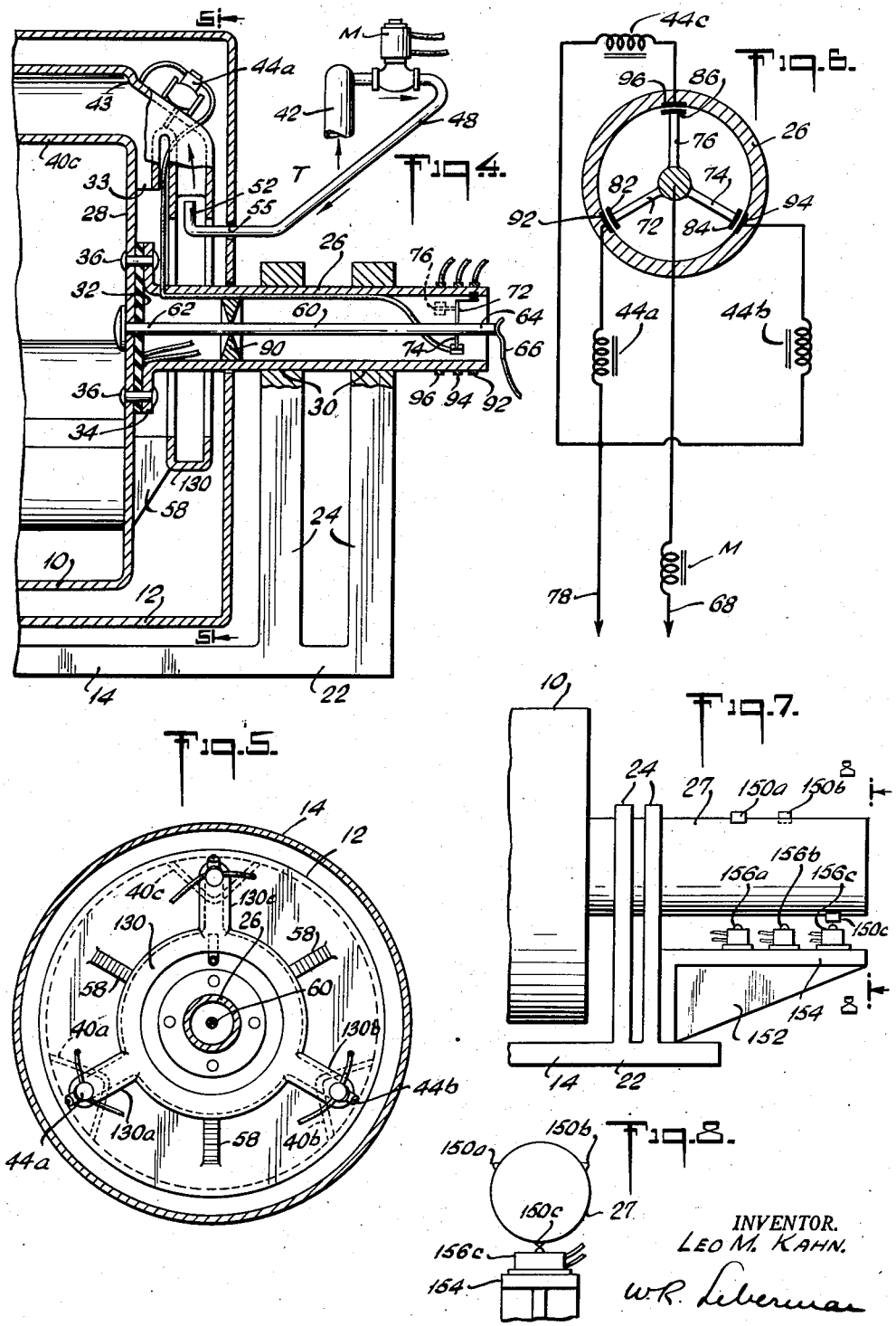

Patented Sept. 16, 1952

2,610,523

UNITED STATES PATENT OFFICE 2,610,523

AUTOMATIC BALANCING SYSTEM FOR ROTATABLE ARTICLE HANDLING MACHINES

Leo M. Kahn, Brooklyn, N. Y.

Application December 16, 1950, Serial No. 201,152

16 Claims. (Cl. 74—573)

The present invention relates generally to fluid extracting devices and methods, and in particular it relates to systems for extracting fluid from articles, such as clothing, linens or the like, which have been laundered, cleaned or otherwise wetted. The present invention is in part a divisional of my co-pending application Serial No. 29,376, and in part a continuation thereof, and it relates more particularly to the means for and method of determining the point or site of unbalance in the rotating cylinders used for extracting liquid from the wetted articles, so that counterbalance material may be introduced at proper points about the cylinder to restore the balance and insure smoothness of rotation and maximum efficiency in extracting and ejecting the fluid.

It is well understood that the degree of drying of articles in machine of the above nature depends upon the extent of the centrifugal force produced by high speed rotation of the cylinder so as to eject the liquid from the articles. However, articles of wet clothing or linens, from their very nature, are generally unsymmetrically distributed in the cylinder, whether it be mounted for rotation on a vertical or on a horizontal axis, and such undesirable weight distribution produces severe vibrations in the rotating cylinder. These vibrations impose a limit upon the speed of rotation and adversely affect the degree and time of drying in addition to being potentially injurious to the machine. In practice, therefore, most laundering establishments have found it necessary to divide a cylinder into radial chambers by using partitions, and by weighing the articles put into each chamber in order to secure approximate initial balance prior to high speed rotation. It is obvious that such practice is laborious and time consuming and, furthermore, does not anticipate changes in weight distribution as the extraction of liquid proceeds to completion. Those establishments which dispense with such precautions must be alert constantly in the operation of their equipment to avoid excessive vibration and consequent danger to the operators thereof and to the apparatus.

In the forms shown herein, a cylinder is provided with peripherally disposed pockets to which are selectively and automatically applied counterbalancing liquids in such a manner as to neutralize the effect of improper weight distribution within the cylinder.

Accordingly, the present invention has an important object thereof, the provision of means which will be automatically operable on rotation of the cylinder, to locate the portion of the cylinder which is overweighted and signal such information to the counterbalancing means. In other words, it is an important object of the present invention to use the cylinder vibration due to unbalance to signal the very existence and site of such unbalance, and almost simultaneously therewith to provide such signal operated means to direct liquid counterbalance material to selected points on the cylinder to restore the balance thereof.

Another object of the present invention is the provision of unbalance pick-up means mounted directly on the rotating cylinder and rotatable therewith, which means will be responsive to unbalanced conditions in the cylinder to note such conditions of unbalance and signal the site thereof.

Another object of the present invention is the provision of unbalance pick-up means of the character described mounted on an end of the cylinder and rotatable therewith, said means comprising in part an elongated rod or shaft extending axially of the cylinder and vibratable therewith on the development of a state of unbalance in the cylinder.

Still another object of the present invention is the provision of unbalance pick-up means comprising a hollow shaft mounted on the cylinder and rotatable therewith, an elongated rod within the shaft rotatable therewith, the rod being fixed to the cylinder at one end thereof, and free to vibrate at the other end in response to conditions of unbalance in the cylinder during rotation thereof.

Still another object of the present invention is the provision of unbalance pick-up means comprising an elongated rod mounted on the cylinder for rotation therewith, one end of which rod is secured to the cylinder, the other end of which is free to vibrate in response to cylinder unbalance, an intermediate portion of the rod being held to limit the amplitude of the vibration of the rod.

Still another object of the invention is the provision of unbalance pick-up means comprising a rod or shaft extending axially of the cylinder and rotatable thereby and therewith, an end of which rod or shaft is free to vibrate in response to unbalance in the rotating cylinder, and provided with means at the vibrating end to reflect the site of overweight in the cylinder causing the unbalance and to control the application of counter-weight material to portions of the cylinder opposite the overweighted portions whereby to balance the cylinder. Associated objects in this respect are the provision of particular means to reflect the site of unbalance as a spider on the vibrating end of the rod, the arms of which spider are in the same plane and the encircling shaft is provided with circumferentially spaced apart contacts also in the same plane; or as a spider the arms of which are provided with longitudinally off-set contacts and the encircling shaft is provided with circumferentially spaced apart contacts which are also spaced apart lengthwise of the shaft; and has a plurality of circumferentially and lengthwise spaced apart contacts on the free vibrating end of rod, with a plurality of micro-switches or other signal devices mounted on a fixed bracket in line with the vibrating rod.

Still another main object of the present invention is the provision of means to introduce counterbalancing liquid material to a rotating cylinder which comprises a single liquid feeding ring in communication with a plurality of angularly spaced peripheral pockets disposed about the cylinder, each pocket being separately controlled to admit counterbalance material from the ring in response to signals indicating a point of overweight unbalance opposite thereto.

In the drawings annexed hereto and forming a part hereof,

Figure 1 is a vertical, longitudinal section through one form of apparatus constructed according to and embodying my invention;

Figure 2 is a diagrammatic wiring diagram of the electrical circuits;

Figure 3 is a diagrammatic wiring diagram of a modification;

Figure 4 is a view similar to Figure 1 of a modified form of apparatus also according to the present invention;

Figure 5 is a vertical section on the line 5—5 of Figure 4;

Figure 6 is a diagrammatic wiring diagram of the circuits in the embodiment of Figure 4;

Figure 7 is a side elevational view of a portion of the apparatus illustrating a modified unbalance pick-up means according to the present invention; and Figure 8 is an end elevation along the line 8—8 of Figure 7.

The rotating cylinder 10 is disposed for rotation within a suitable enclosure or housing 12, on base or platform 14. Cylinder 10 is provided with an opening 16 in an end wall 17 for the introduction of the material to be dried thereinto, and housing 12 is provided with a registering opening 18 and with a closure 20 therefor in the adjacent end wall 21 for obvious reasons.

Base or platform 14 has an extended portion 22 provided with upwardly projecting standards 24, 24 in which cylinder 12 is supported. As shown herein, cylinder or drum 12 is supported or driven at one end thereof, and is referred to generally as a rigid bearing single end supported device, which is to be distinguished from a yieldable bearing permitting free cylinder oscillation. The driving power for rotating cylinder or drum 12 is not shown herein since numerous devices may be employed for such purpose, it being understood herein that cylinder 12 is rotatable under controlled speed as disclosed in copending application Serial No. 29,376. The support for cylinder 12 is provided by the use of an elongated shaft 26 which is rigidly secured to the end wall 28, at the center thereof, of cylinder or drum 12 opposite opening 16, shaft 26 being of course rotatable with the cylinder, and extending through aligned openings 30, 30 in the spaced-apart standards 24, 24 wherein suitable anti-friction bearings are located. Interposed between cylinder end wall 28 and shaft or trunnion 26 is a yieldable pad or gasket 32, providing slightly resilient or yieldable support, although this may be dispensed with as may be desirable. The engaged end of shaft or trunnion 26 is flanged outwardly, as at 34, and bolts 36, 36, passing through registering openings in flange 34, pad 32 and end wall 28, secure the shaft or trunnion to the cylinder.

Cylinder 12 is of perforate material, as sheet metal or the like, to permit expressed or extracted liquid to pass therefrom to the floor of housing 12 and out past valve 38, and is arranged to receive damp or wet material therewithin from which the moisture is to be extracted. A plurality of ribs are provided on the interior face thereof, these ribs being formed of imperforate material, hollowed, with solid or enclosed rear end walls 42, and forming pockets or chambers 40a, 40b, 40c for the reception and retention of weight counterbalance material. Pockets 40a, 40b, 40c are angularly and equally spaced around the periphery of the cylinder so as to divide it effectively into three weight receiving portions or chambers 120° apart, although it is evident that four or even more ribs or pockets may be employed and spaced apart accordingly.

It is, of course, evident that pockets or chambers 40a, 40b, 40c may be located on the outside, rather than the inside of the cylinder, and, if desired, conventional inside ribs may be used for the agitating or material lifting function. Such expedient is shown in prior application Serial No. 673,680, and in such case the ribs may be perforated or the like as is well known, such rib construction being often considered of advantage for washing purposes.

Means are provided to feed water or other counterbalance liquid from a tank or other source as T to the pockets 40, when required by a condition of unbalance via piping 42. Electrically actuated feed controls 44a, 44b, 44c are provided for this purpose, the operation and control of which will be hereinafter described, although each of the feed controls may be replaced by individual and similarly controlled pumps. Assuming that the controls are actuated as required, the liquid flows through feed pipes 46a, 46b, 46c as in Figure 1, or through feed pipe 48, as in Figure 4, to upwardly directed jets 50a, 50b, 50c (Figure 1) or jet 52 (Figure 4). It will be obvious that, in connection with the apparatus of Figure 1, either one or two of such feed pipes 46 will operate at any one time in order to correct a condition of unbalance.

Assuming now that a control member in Figure 1 permits the liquid to flow through one of pipes 46a, b, c, for example, pipe 46a, such liquid will flow through jet or nozzle 50a into feed ring 52a. Feed ring 52a is arranged to feed the liquid through a suitable pipe as 54 into one of the pockets 40, while feed rings 52b and 52c are arranged to feed the other pockets 40b, 40c respectively through other pipes 54, each ring 52a, b, c having a separate pipe as 54 connected to each pocket.

Feed rings 52a, b, c, are channel or U-shaped in cross-section and are open along their entire annular floors so as to have an endless inlet. The feed rings together may form a unitary sub-assembly as by being welded together in the relationship illustrated. Such sub-assembly is made fast to the cylinder so as to rotate therewith by tack welding or otherwise securing the inner end wall 56 of the innermost feed ring 52a to radiating ribs 58 which are themselves secured to or formed integrally with cylinder end wall 28. The feed rings 52a, 52b, 52c are disposed about shaft 26 concentrically for purposes which will hereinafter be made clear.

When, for example, liquid is applied through jet 50c to the open annular floor of feed ring 52c, centrifugal force will direct and maintain such liquid adjacent the periphery of the feed ring notwithstanding the fact that each feed ring is open at its center and annular floor. As the liquid is injected into the feed ring 52c during rotation of the cylinder, it is forced and escapes through the connecting pipe 54 into the upper portion of the associated pocket 40, which is closed by end wall 42. There is provided an opening 33 at the lower front of the pocket to serve as a discharge outlet for the pocket as will hereinafter appear.

The feed rings rotate axially about shaft 26, and each has a discharge opening as 53c (Figure 1). When liquid is injected into the open channel of feed ring 52c, the centrifugal forces generated by the rotation of the feed ring will cause the liquid to collect initially about the peripheray of the ring and then to flow out therefrom through opening 53c into the pocket 40c in communication with that particular ring. It may very well be that the opening at 53c exerts a negative pressure to aid in movement of the liquid from the ring into the pocket, but whether or not this is the fact, experience has shown that there is sufficiently fast flow of the water from the rings into the separately associated pockets to secure counterbalancing quickly.

It will be evident that jets 50a, b, c do not rotate with the cylinder and shaft assembly, but extend into housing 12 from the stationary pipes 46a, 46b, 46c which traverse opening 55 of housing 12. Liquid flowing from the jets will be collected in the feed rings and directed to the respective outlets as above described. The feed rings make possible a fast and positive distribution of the counterbalance liquid so as to achieve such distribution in short order and to keep pace with the changing weight distribution as the liquid is extracted from the wet or damp articles. While the device including a separate feed ring for each pocket works quite well, I have, as will be explained below, achieved an improvement whereby a single feed ring may be used and operate efficiently with any number of counterbalance material receiving pockets.

As any one or two pockets as 40a, 40b or 40c fills with liquid introduced through the pipes 54, such liquid is maintained along the inner peripheral surface of the pocket pursuant to centrifugal force. The liquid may accumulate as far down as the lower edge of end wall 43 whereupon it will enter the housing through opening 33. However, the pockets will be of such size as to accommodate enough liquid to compensate for any encounterable degree of unbalance within the intended operation of the machine as hereinafter set forth. Accordingly, the injected counterbalance liquid will be retained within the pocket during the extraction operation. At the termination of such operation, and when the speed of cylinder rotation decreases sufficiently, the counterbalance liquid will rapidly discharge from the pockets and dropping to the floor of the cylinder will flow out therefrom through opening 33. It can be seen, therefore, that by relying on centrifugal forces to maintain the fluid as injected, the discharge may be facilitated and its required duration materially decreased. The floors of the pockets 40a, 40b, 40c are inclined towards the discharge openings 33, 33 so as to more effectively discharge the fluid therethrough.

The electrical operation comprising the control system of the apparatus will now be described. The apparatus applies counterbalancing liquid to selected pockets during acceleration and high speed rotation of the cylinder and in response to a specific condition of unbalance. Means are provided to establish the presence of a predetermined degree of unbalance and its location, and certain corrective measures are thereupon automatically put into effect via the selected pocket or pockets. Thus, the site of unbalance can be located by a vibration responsive device, as hereinafter described. An electrical circuit is provided, which reacts to a contact stimulus to establish instantaneously the position of a point of unbalance. The reaction is arranged to control the action of one or more associated valves 46a, 46b and 46c and thereby introduce counterbalance liquid into selected feed rings and pockets.

When the overweighted portion of the unbalanced, rotating cylinder passes a predetermined point, an electrical signal is produced which indicates both the presence of unbalance and its specific location within the cylinder, and simultaneously therewith.

As illustrated in Figure 1, an elongated rod 60 is fixed at an end 62 thereof to the middle of cylinder end wall 28. Rod 60 will thereby rotate with said cylinder, and of course with the surrounding hollow shaft 26 which is also fixed to the cylinder. The other and free end 64 of rod 60 is extended slightly, but not necessarily, beyond the end of shaft 26 and arranged in wiping contact engagement with a contact blade 66 connected to one side of a power line 68. The end of rod 60 is suitably insulated from the body thereof and from cylinder 10, as will be readily understood. Mounted on rod 60 adjacent end 64 thereof is a spider 70, which may be formed integral with rod end 64 or secured thereto, the spider having three arms 72, 74, 76 in circuit with power line 68 through blade 66, and having contact terminals 82, 84, 86 at the ends thereof normally spaced inwardly of the encircling shaft 26. It will be noted, by reference to Figure 2, that the terminal fingers of contacts 82, 84, 86 are offset one from the other lengthwise or longitudinally of the shaft. I provide three stationary conducting rings 92, 94, 96 about shaft 26, spaced from each other lengthwise of shaft 26, each of which is vertically aligned with rings of contact terminals 82, 84, 86. The mounting of stationary conducting rings 92, 94, 96 about shaft 26 and their insulation from the body of shaft 26 and cylinder 10, extending through shaft 26 towards the inner aspect thereof may be accomplished in any suitable manner, as will be readily understood. Wiring from each ring to valves 44a, 44b, 44c and thence to the other side 78 of the power line is provided as indicated at 80a, 80b, 80c, see Figure 2. Rod 60 is not permitted to vibrate freely along its entire length, and the portion thereof permitted to vibrate is controlled by the insertion of a needle-point shouldered sleeve 90 inside shaft 26 encircling rod 60 nearer to its engaged end 62 than to its free and vibratable end 64. Rod 60 will, of course, partake of the movement or vibration of cylinder 10, and, will vibrate towards the side opposite the point of unbalance, pivoting about the firmly held portions between end 62 and sleeve 26, it being understood that sleeve 26, rod 60 and collar 90 all rotate simultaneously.

When, for example, a point of unbalance due to overweight develops in the cylinder between two pockets as between pockets 40a and 40c, the cylinder will start vibrating off-center, and its connected rod 60 will vibrate and cause spider 70 to vibrate and swing arm 72 and contact 82 against ring 92, thereby completing the circuit to liquid control 44b and causing counterweight liquid material to flow therethrough and enter ring 52b through jet or nozzle 50b. In like manner, conditions of overweight unbalance elsewhere in cylinder 10 will be reflected in the vibration and shifting of rod end 64 to control the application of counterweight liquid to pockets 40a or 40b or to any two pockets, if the condition of unbalance is opposite the mid-point therebetween.

In Figure 3, I have provided a modification of the electrical circuit which will perform in substantially the same manner, except that I eliminate the necessity for a direct electrical connection to rod end 64. In this modification, spider arms 102, 104, 106 terminate in bridge contact members 112, 114, 116 respectively. Instead of stationary conducting rings, I provide current from one side of the power line to one of a pair of spaced contacts, the other contact of the pair going to the other side of the power line. Thus, three pairs of spaced contacts 122, 122'; 124, 124' and 126, 126' are provided about shaft 26, and suitably insulated therefrom. The vibration and shifting of the rod end will be reflected by movement of the spider, as above described. Thus, when rod end 64 is so shifted as to cause bridge contact 116 to bear against spaced contacts 126, 126', the circuit to valve 44b will be completed to cause the flow of counterweight material to pocket 40b, the overweight being opposite thereto.

In Figures 4 and 5, I have illustrated a modification of my cylinder and valving arrangement in a cylinder having three counterweight receiving chambers. I provide a single counterbalance liquid material receiving ring 130 having three outlets and piping 130a, 130b, 130c, one to each of pockets 40a, 40b and 40c. A flow control member as 44a, 44b, 44c is disposed within the pipe lines between the ring and the pockets adjacent the entrance into each pocket. A master valve M is included in the circuit, on one side 68 of the power line. The individual pocket flow control members 44a, 44b, 44c rotate along with cylinder 10, shaft 26 and rod 60, and are connected by suitable wiring within shaft 26 to the spider 70 and contacts 82, 84, 86 thereon. When a condition of unbalance develops and a contact is made in response thereto as at 84, 94, the circuit is completed, see Figure 6, from side 68 of the power line, through master valve M through spider 70, across contacts 84, 94 thence to flow control member 44b and finally to the other side 78 of the power line, energizing and opening valve M to permit passage of liquid counterweight material therethrough, into pipe 48 and out through jet or nozzle 52 into ring 130 and, simultaneously therewith, opening flow control member 44b to permit the passage of the counterweight material into pocket 40b.

In the modification of my invention illustrated diagrammatically in Figures 7 and 8, the cylinder supporting shaft or rod 27 has disposed thereon a plurality of buttons or cams as 150a, 150b, 150c which are angularly spaced about the shaft or rod 120° degrees apart, and also lengthwise or longitudinally of the shaft, as shown. A suitably positioned bracket 152 is firmly secured to base 14, 22 having an arm 154 extending in parallel relation to but spaced from shaft or rod 27. Three micro switches as 156a, 156b, 156c are disposed on arm 154 and spaced thereon to be in alignment respectively with contacts or cams 150a, 150b and 150c. The possible electrical wiring and circuit arrangements from the power lines to the liquid flow control members will be readily apparent from the modification of Figures 2 and 6, hence are omitted from this modification since same is readily understandable from the foregoing. When a condition of overweight unbalance develops, it will be reflected by vibration and shifting of the end of shaft 27 and the tripping of the affected micro switch or switches. The arrangement of counterweight material receiving pockets, wiring and flow controls may be as in Figures 1 or Figures 5 and 6, as will be readily apparent.

The unbalance pick-up of the modification of Figures 7 and 8 is disposed adjacent the free end of shaft 27, the other end being fixed to the cylinder 10 for rotation therewith, thus the variations of vibration between the standards 24, 24 or between the engaged end of shaft 27 and the standards are reflected in physically amplified form to the pick-up, although such amplitude may be regulated as described by varying the resilience of the gasket 32 as in Figures 1 and 4, or by varying the position of sleeve 90.

It is to be understood that holdover means may be provided in the various circuits to provide for sufficient continuity in the injection of the counterbalancing liquid material into the pockets. One such means is shown in my previous application, and hence is not illustrated or described in detail herein.

While I have illustrated and described the present inventions as applied to cylinders rotating on a horizontal axis, my inventions are equally applicable to cylinders mounted for rotation on a vertical axis, and to a worker skilled in the art the changes necessary to convert from horizontal to vertical axis rotation will be obvious.

As noted above, while cylinders with three peripherally arranged counterweight receiving pockets are provided, and the shaft or rod has a signal means at the vibrating end thereof for each pocket, the invention is not to be limited to such specific number, and is to be restricted only by the scope of the appended claims.

Having described my invention, what I claim and desire to secure by Letters Patent is:

1. Balancing apparatus for a rotatable hollow cylinder for housing discrete articles to be treated, said apparatus comprising a plurality of hollow counterweight liquid material receiving elements arranged to receive counterbalance liquid from an external source thereof, said elements being angularly arranged around the periphery of said cylinder and differentially affecting the balance thereof when said liquid is selectively applied thereto, and a feed ring rotating concentrically with the cylinder, said feed ring being substantially channel shaped so as to have an endless inlet for liquid injected therein from said external source, and having an outlet therefrom to each of the counterweight receiving elements.

2. Balancing apparatus for a rotatable hollow cylinder for housing discrete articles to be treated, said apparatus comprising a plurality of hollow counterweight liquid material receiving elements arranged to receive counterbalance liquid from an external source thereof, said elements being angularly arranged about the periphery of the cylinder and differentially affecting the balance thereof when said liquid is selectively applied thereto, and a feed ring on and rotating concentrically with the cylinder, said feed ring being substantially channel shaped so as to have an endless inlet for liquid injected therein from said external source, a separate outlet from the ring to each counterweight receiving element, and liquid flow control means between each outlet and an associated counterweight receiving element.

3. Balancing apparatus as in claim 2, wherein the flow control means comprise valves normally closed to block off communication between the feed ring and the counterweight receiving elements, said valves opening in response to conditions of unbalance in the rotating cylinder to permit flow of counterweight material into at least one of the counterweight receiving elements.

4. Balancing apparatus for a rotatable hollow cylinder for housing discrete articles to be treated, said apparatus comprising a plurality of weight receiving elements arranged to receive liquid counterbalance material from an external source thereof, said elements being respectively disposed adjacent spaced peripheral portions of said cylinder and differentially affecting the balance thereof when said liquid is selectively introduced thereinto, and an annular feed ring rotatably associated with the cylinder, said feed ring being substantially channel-shaped so as to have an endless inlet for liquid counterbalance material introduced thereinto from said external source, the feed ring being disposed concentrically around the longitudinal axis of the cylinder, and having individual communication with each of the weight receiving elements.

5. In an apparatus for housing discrete articles to be treated including a hollow rotatable cylinder, balancing means therefor, said balancing means comprising a spaced series of weight receiving elements on said cylinder peripherally arranged to receive liquid counterbalance material from an external source thereof, a single feed ring communicating with all of said elements so as to feed liquid thereinto from said ring, said ring having an endless channel for receiving liquid injected thereinto, and a feed jet for said ring, said jet having a discharge nozzle which is directed so that injected liquid flows into said ring.

6. Balancing means for a rotatable hollow cylinder for housing discrete articles to be treated, said balancing means comprising a control system for applying and receiving counterbalance weights at selected peripheral areas of said cylinder, and a pick-up in said control system for detecting the presence and the site of overweight unbalance during cylinder rotation, said pick-up comprising a shaft connected to and extending longitudinally from the cylinder and rotating concentrically therewith, the unconnected end of said shaft, on development of a state of unbalance in the cylinder during rotation thereof, vibrating out of axial alignment with the longitudinal axis of the cylinder towards the side opposite the overweight in the cylinder.

7. Balancing means for a rotatable hollow cylinder for housing discrete articles to be treated, said means comprising a control system for applying and receiving counterbalance liquid material at selected peripheral areas of said cylinder, and a pick-up in said control system for detecting the presence and site of overweight unbalance during rotation of the cylinder, said pickup comprising an elongated shaft secured by one end thereof to an end of the cylinder for axial rotation therewith, means to support said shaft rotatably, the cylinder being disposed on one side of the support and the other end of the shaft extending beyond the support on the other side thereof, the unconnected end of the shaft being vibratable in response to conditions of overweight unbalance in the rotating cylinder towards the side opposite the point of unbalance.

8. In a balancing apparatus for a rotatable hollow cylinder, a plurality of hollow counterweight liquid material receiving chambers arranged angularly about the periphery of the cylinder so as to differentially affect the balance thereof when said liquid is selectively applied thereto, a shaft extending from one end of the cylinder and rotatable axially therewith, an electrical pick-up device for detecting a state of unbalance in the rotating cylinder on the shaft and including a similar plurality of contacts arranged angularly about the periphery of the shaft adjacent the unconnected end thereof, the shaft end being vibratable in response to a condition of overweight unbalance in the rotating cylinder.

9. In a balancing apparatus as in claim 8, in which the contacts are arranged in different planes spaced lengthwise of the shaft.

10. A balancing apparatus as in claim 8, having a hollow sleeve about the shaft and rotatable axially therewith and with the cylinder, and means interposed between the shaft and sleeve to limit the amplitude of vibration of the shaft.

11. A balancing apparatus as in claim 8, having a hollow sleeve about the shaft and rotatable axially therewith and with the cylinder, the contacts being arranged in longitudinally spaced relation to each other lengthwise of the shaft and mounted on arms projecting radially from the shaft, normally spaced inwardly of the encircling sleeve.

12. A balancing apparatus as in claim 11, in which the sleeve is provided with a plurality of contact rings spaced apart lengthwise of the shaft, each in the same plane with a shaft contact.

13. A balancing apparatus as in claim 11, in which the sleeve is provided with a plurality of contact rings spaced apart lengthwise of the shaft, each in the same plane with a shaft contact, the contact rings being stationary for wiping engagement by one or more of the arm supported contacts on vibration of the shaft in response to a specific condition of overweight in the cylinder.

14. In a balancing apparatus for a rotatable hollow cylinder, a plurality of hollow counterweight liquid material receiving elements arranged angularly and peripherally about the cylinder so as to differentially affect the balance thereof when said liquid is selectively applied thereto, an elongated shaft extending from one end of the cylinder and supporting said cylinder, the shaft rotating concentrically with the cylinder, individual liquid inlet controls for each element, an elongated sleeve concentric with and encircling the shaft, a plurality of contact points angularly arranged about the shaft, a plurality of contacts on the sleeve, an electric circuit connecting the shaft and the contacts thereon to one side of a power line, the other side of the power line connecting the inlet controls and the contacts on the sleeve, the shaft being vibratable on development of unbalance in the rotating cylinder to close the circuit between two or less shaft contacts and two or less sleeve contacts and two or less inlet controls whereby to selectively apply counterweight material to two or less elements opposite the point of overweight unbalance.

15. In a balancing apparatus for a rotatable hollow cylinder, a plurality of hollow counterweight liquid material receiving elements arranged angularly about the cylinder so as to differentially affect the balance thereof when said liquid is selectively applied thereto from an external source thereof, a shaft supporting the cylinder extending from one end of the cylinder and rotatable axially therewith, a pick-up device for detecting a state of unbalance on the rotating cylinder, said pick-up being mounted on the shaft and comprising a similar plurality of cams peripherally disposed about the shaft end and arranged angularly and lengthwise thereof, a bracket arm disposed in spaced parallel relation to the shaft normally out of engagement therewith, a similar plurality of normally open micro switches arranged on the arm lengthwise thereof in line with the shaft cams, a similar plurality of liquid flow control, each micro switch being electrically connected to a flow control, vibration of the shaft in response to the development of a condition of unbalance in the rotating cylinder causing engagement of a cam opposite the point of unbalance with the micro switch in line therewith, closing of said switch and actuation of the flow control to the liquid receiving element opposite the point of unbalance.

16. Balancing apparatus for a rotatable hollow cylinder for housing discrete articles to be treated, said apparatus comprising a plurality of hollow counterweight liquid material receiving elements arranged to receive counterbalance liquid from a source thereof, said elements being angularly arranged about the periphery of the cylinder and extending lengthwise thereof, differentially affecting the balance thereof when said liquid is selectively applied thereto, and a liquid container on an end of and rotating concentrically with the cylinder, said container having a separate outlet therefrom to each of the peripherally spaced counterweight receiving elements, liquid flow control means between each outlet and an associated counterweight receiving element and an exit port for venting the counterweight material from each element and by-passing the source thereof.

LEO M. KAHN.

REFERENCES CITED

The following references are of record in the file of this patent:

UNITED STATES PATENTS

| Number | Name | Date |
|---|---|---|
| 1,604,748 | Grauer | Oct. 26, 1926 |
| 2,196,039 | Thearle | Apr. 2, 1940 |
| 2,375,635 | Dyer | May 8, 1945 |
| 2,461,645 | Kallman | Feb. 15, 1949 |
| 2,491,003 | Brooks | Dec. 20, 1949 |
| 2,534,269 | Kahn et al. | Dec. 19, 1950 |
| 2,548,809 | Norman | Apr. 10, 1951 |
| 2,549,756 | Clark | Apr. 24, 1951 |